United States Patent [19]

Thornson

[11] Patent Number: 4,631,971
[45] Date of Patent: Dec. 30, 1986

[54] APPARATUS FOR DEVELOPING A PROPULSION FORCE

[75] Inventor: Brandson R. Thornson, Winnipeg, Canada

[73] Assignee: Fortune Ventures Inc., Winnipeg, Canada

[21] Appl. No.: 614,051

[22] Filed: May 25, 1984

[30] Foreign Application Priority Data

Jun. 2, 1983 [GB] United Kingdom ............... 8315114

[51] Int. Cl.⁴ ............................................. F16H 33/02
[52] U.S. Cl. .................................... 74/84 R; 74/84 S; 180/7.1; 244/62
[58] Field of Search ............... 74/84 R, 84 S; 180/7.1; 244/62, 172

[56] References Cited

U.S. PATENT DOCUMENTS 3,530,617  9/1970  Halvorson et al. ................. 74/84 S

FOREIGN PATENT DOCUMENTS 213927  6/1956  Australia ............................. 74/84 S
1547762  8/1976  United Kingdom ................ 74/84 S Primary Examiner—Allan D. Herrmann
Attorney, Agent, or Firm—Stanley G. Ade; Adrian D. Battison

[57] ABSTRACT

A propulsion device comprises two symmetrical wheels mounted in the same plane for rotation about parallel axes at right angles to the plane and driven synchronously in opposite directions. Each wheel carries a pair of gearwheels which rotate around the axis of the wheel with the wheel and support eccentrically a pair of planet masses. The masses are arranged such that their distance from the axis of rotation of the wheel increases and decreases under control of the gearwheels. At a position immediately prior to the maximum distance of the planet from the axis, an electromagnetic device restrains outward movement of the planet mass so that when released the planet mass provides whip-like action inducing a resultant force in a direction at right angles to the plane containing the axes of the wheels.

14 Claims, 15 Drawing Figures

APPARATUS FOR DEVELOPING A PROPULSION FORCE

This invention relates to an apparatus for developing a propulsion force, which force can be used to propel the apparatus.

Propulsion of an object without contact with a relatively fixed body for example the ground or a planet surface is generally only obtained by movement of air or other gases in opposite direction to the movement of the object under the effect of jet or propellor systems. In the absence of a suitable atmosphere, for example in space, propulsion is generally obtained by rocket systems or by other systems which involve the projection of particles at high velocity from the object. Such systems of course require the consumption of fuel since the fuel must form the particles to be projected.

Attempts have been made for many years to develop a propulsion system which generates linear movement from a rotational drive. Examples of this type of arrangement are shown in a book entitled "The Death of Rocketry" published in 1980 by Joel Dickenson and Robert Cook.

However none of these arrangements has in any way proved satisfactory and if any propulsive effect has been obtained this has been limited to simple models.

It is one object of the present invention, therefore, to provide an improved propulsion system which obtains propulsive force in a resultant direction without the necessity for the opposite projection of particles.

Accordingly, the invention provides an apparatus for developing a propulsion force comprising two symmetrical bodies, support means mounting the bodies for rotation about parallel spaced first axes and driving means for synchronously rotating the symmetrical bodies about the respective axes in opposite directions, each body including a pair of planet masses, means mounting each planet mass on the respective body, said mounting means being arranged such that the respective mass can freely rotate eccentrically about a second axis parallel to the first and such that the second axis rotates with the body about the first and moves radially relative to the first in timed relation to the rotation of the body so as to move during each cycle of rotation of the body from a position of minimum spacing to a position of maximum spacing and back to the position of minimum spacing from the first, and means for cyclically inhibiting and releasing rotation of the planet mass about the respective second axis so as to cause the planet mass to pivot inwardly relative to the first axis whereby said releasing causing a force outwardly of the first axis with the bodies arranged such that a reultant force from said forces lies at right angles to a plane adjoining the axes.

The inhibiting means preferably is arranged on the body for rotation therewith and uses electromagnetic forces to restrain the movement of the planet mass. In addition the positioning of the electromagnetic restraining device is such that the planet mass is released immediately prior to its position of maximum spacing from the first axis so that it provides a whip-like action while travelling at its maximum velocity.

The use of this basic technique can be incorporated into a vehicle propulsion system by providing four such bodies with the axes arranged at the corners of a rectangle so that by changing the body with which each body is associated in a pair from one adjacent body to another adjacent body forces in four different directions can be obtained. This effect can be further enhanced by mounting the bodies in pairs around the periphery of a circular support frame.

Preferably the bodies are in form of wheels or discs which support the planet masses and gearwheels for controlling the movement of the axes of the planet masses.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

Examples of the apparatus will now be described in relation to the accompanying drawings in which.

Figure 1:
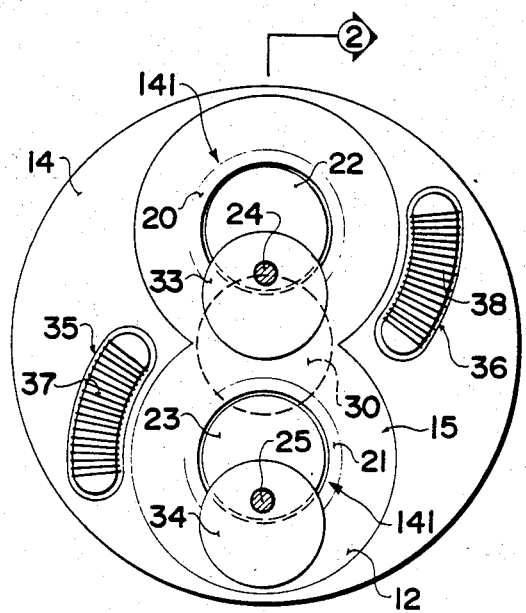
FIG. 1 is a cross-sectional view along the lines 1—1 in FIG. 2 of one rotatable body or EZKL of an apparatus according to the invention in stationary position.
Figure 2:
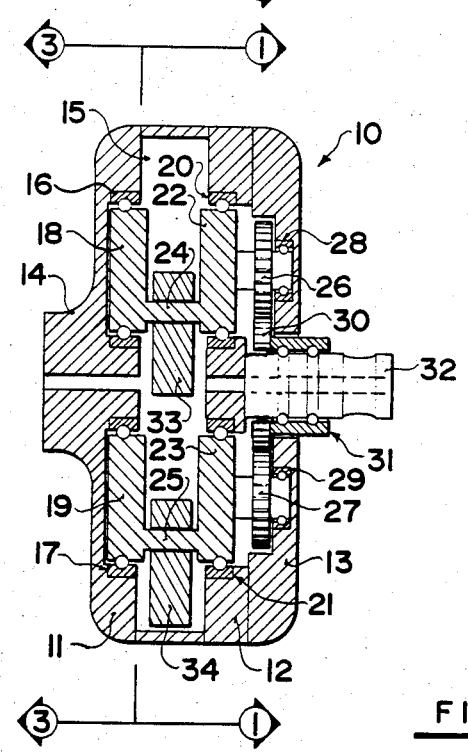
FIG. 2 is a cross-section along the lines 2—2 of FIG. 1.
Figure 3:
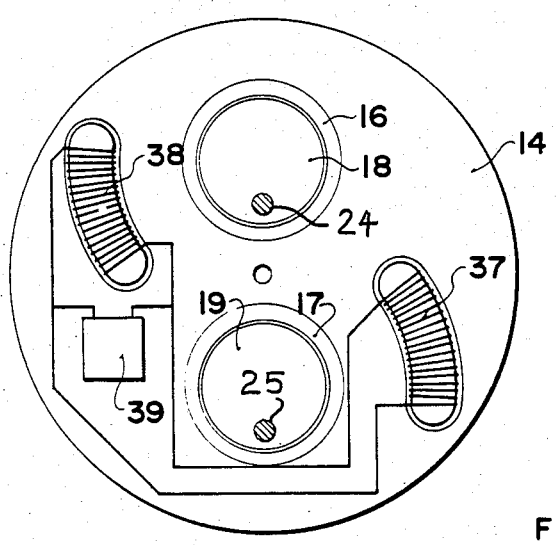
FIG. 3 is a cross-section along the lines 3—3 of FIG. 2.

Referring firstly to FIGS. 1, 2 and 3, one example of a body or EZKL is illustrated and comprises a housing 10 formed in three sections 11, 12 and 13. The section 11 comprises a relatively thick plate having a pair of bores 15 formed approximately half the way through the plate, the bores being of such a dimension that they intersect adjacent the centre of the circular plate 14 and approach approximately the outer wall thereof. The bearings incorporating a ball-race, support a pair of discs 18, 19 for rotation in the plate.

The second portion 12 comprises a circular plate concentric with the plate 14 so as to close the bores 15 and similarly provides counter bores for receiving a pair of bearing rings 20, 21 symmetrically to the bearing rings 16, 17. Similarly, the bearing rings 20, 21 support discs 22, 23 for rotation about the same axes as the discs 18, 19. The discs 18, 22 are linked by a pin 24 so they co-rotate and similarly the discs 19, 23 are mounted upon a shaft keyed to a respective gear wheel 26, 27 for co-rotation with the respective disc. The shaft is also mounted in bearings 28, 29 provided in the third section 13 of the housing.

In this way, two separate wheels, one provided by the discs 18, 22, the pin 24, the shaft, the gear wheel 26 and mounted for rotation in three bearings, and the other being provided symmetrically by the other discs and co-operating portions are provided. The two wheels are driven in the same direction by a co-operation with a stationary gear 30 mounted in bearings 31 provided on the portion 13 while the body as a whole is rotated by a shaft 32 driven by means (not shown).

It will be noted that the pins 24, 25 are mounted eccentrically relative to the axis of rotation of the respective wheel. It will also be noted that the wheels are driven in opposite directions at the same rate of rotation and hence remain in synchronism.

The pins 24, 25 are mounted near the periphery of the discs and each supports a respective planet mass 33, 34 each of which is, as shown in FIG. 1, circular in plan view and mounted eccentrically relative to the pin such that its centre of mass is spaced from the axis of the respective pin. The bores 15 are of such a dimension that under normal rotation of the discs 18, 19 about the respective rotation axis, the respective mass 33, 34 is flung outwardly so as to lie along a radius joining the rotation axis and the pivot axis of the respective body. The dimension of the bore 15 is chosen such that it is circular with a radius slightly greater than the distance of the furthest point of the mass 33, 34 from the respective rotation axis.

Figure 11:
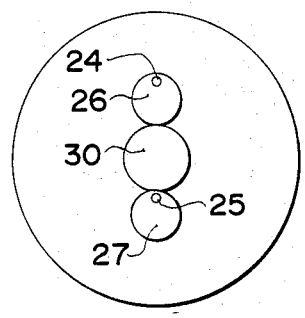
FIGS. 11 through 15 show sequential positions of the body of FIG. 1 at 45° spacing with the pendulum masses omitted for simplicity of illustration.
Figure 12:
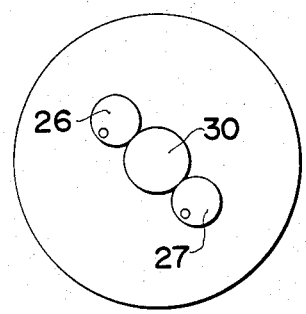
Figure 13:
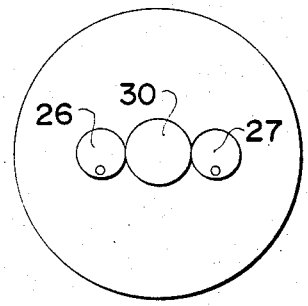
Figure 14:
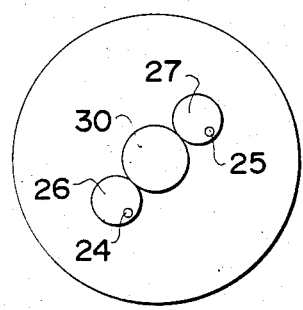
Figure 15:
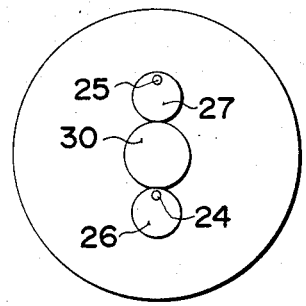

The movement of the gears 26, 27 and the crank pins 24, 25 through 180° of the body movement at 45° spacing is illustrated in FIGS. 11 through 15 and it will be seen that each crank or pin varies in distance from the axis of the stationary gear 30 with the greatest distance of the crank 24 in FIG. 11 and the shortest distance in FIG. 15.

Figure 4:
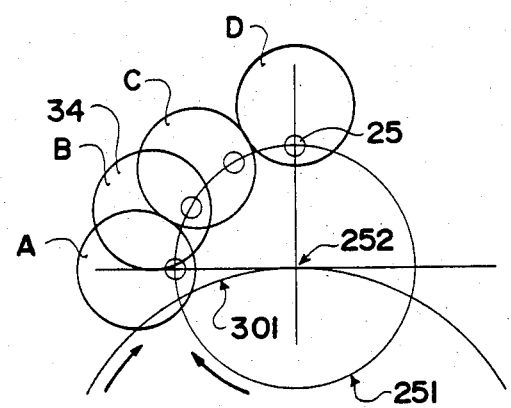
FIG. 4 is a schematic illustration of the motion of one of the planet masses of FIGS. 1, 2 and 3.

Also in each of the plates 14 is provided a partly annular cut-out 35, 36 each of which contains an electromagnetic coil 37, 38, powered by a power source and timing device schematically indicated at 39. The electromagnets 37, 38 act to inhibit the outward movement of the respective mass, one of which is indicated in FIG. 4 in various positions of its movement.

The path of the rotational movement of the pin 25 is indicated 251 and the rotation axis of the disc 19 comprising part of the wheel, is indicated 252. The path of movement of rotation axis 252 is indicated at 301. Four positions of the mass 34 are indicated respectively at A through D and it will be noted that the position C is inhibited inwarwdly of its normal position so that the centre of mass of the planet mass 34 in the positions B and C is no longer on the radius joining the rotation axis 252 and the pivot axis 25.

Figure 5:
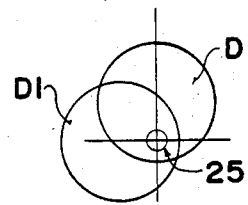
FIG. 5 is a further schematic representation of the motion of the planet mass of FIG. 4.

In FIG. 5, the position D is shown and also at D1 is shown the position immediately prior to the position D where it will be noted that the centre of mass of the planet mass has been drawn inwardly relative to the rotation axis 252 and rearwardly relative to the motion of the pin 25.

It will be noted that the effect of the electromagnets or coils 36, 37 is limited to one portion of the cycle of the wheels and immediately downstream of the effect of the coils, the mass is free to swing outwardly about the pivot axis or pin 25 and relative to the rotation axis 252.

The pulling force is produced by the whip-like increased momentum of a dense mass provided by the bodies magnified through a centrifugal force when each body completes this acceleration phase with an abrupt stop upon its return to its normal orbit path and simultaneously it resumes normal orbiting. This very brief abrupt stopping action produces the pulling impulse caused in effect within the device and transfer this unidirectional force to that which the device is anchored or attached upon.

The bodies are concentrically, bearing mounted upon the crank portion of the discs. The motion of the planets is of a pendulum-type nature through 360°. The device therefore comprises two planets mounted opposite each other and contained within their own half section of the device. The action of each planet is contained in its own section area. The main drive shaft 32 is mounted on bearings (not shown) and secured, by means not visible in the section of FIG. 2, to the frame 10. The gear 30 is fixed to bearing 31 and thence to a control mechanism (not shown) to maintain it stationary at controlled positions such that the shaft 32 can rotate relative to the gear but is meshed relative to the gears 26, 27 to ensure their maintaining of positioning of the crank shafts during operation. The housing 10 rotates around the gear 30 so that the gears 26, 27 complete two rotations each as the housing 10 completes one rotation. When the three gears are aligned vertically with the crank portion or pin in an extended or outward position and away from the device main axle 32. Arrangement of this positioning with the device rotating, creates a new planetary orbit within the device. From external observation, this orbit takes on the appearance of an illusionary wheel within the device but its illusionary axis is away from the axis of the shaft 32.

The electromagnets 36, 37 have the ability to influence and hold each planet, when activated. The rotation carries the planets to and away from the electromagnetc field. The electromagnets act to maintain a short radius of the planet relative to the device axle during a specific rotation of the planet orbit and through a special electronic timing device cease magnetic activity releasing the planet at a specific location to return to its orbit where its mass, ending is interrupted journey, produces the pulling force, prior to resuming its normal orbit path and resuming into the cycle. This pulling force release point location is isolated to that position where the radius between the planet and the device axle is at its greatest distance. The velocity of each planet is in a constant harmonious cycle of change.

As the rotation of the housing 10 is held constant, the planet velocity is at a maximum at the release point as the radius to that of the axle 32 is at its most extended point. Its velocity decreases as its gear brings the planet closer to the axle 32. Upon one half turn of the device, the planet crank shaft gear has completed one complete rotation and reduced the radius of the planet relative to the axle 32 to its minimum length therefore reducing the planet's orbit velocity to its slowest orbit speed. The planet orbit velocity continuously increasing then decreasing takes on a cycle wave length like pattern in regard to momentum forces. This pattern is in balance conversely with the opposite planet actions occurring simultaneously. One planet balances the actions of the other laterally but not perpendicularly.

Operating in a 0 gravity field, a single device as shown would conform to Newtonian law and simply oscillate around its centre of mass as there would be no stabilizing factor to aid the device. The pulling force emittor would cause the device to travel in a circular path due to initial lack of stability or footing to push against.

Figure 7:
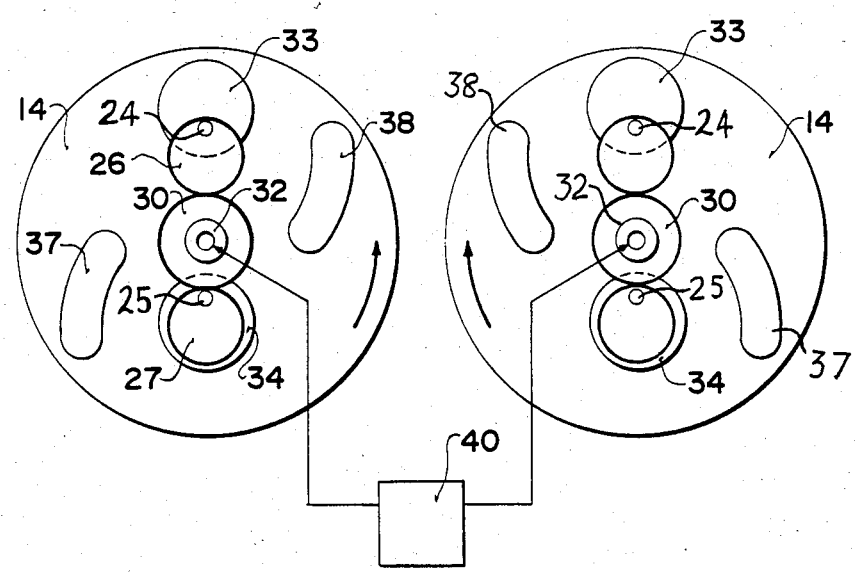
FIG. 7 is a cross-sectional view along the lines 1—1 of FIG. 2 showing two bodies associated into a complete apparatus according to the invention.

Hence it is of necessity that a device rotating in a clockwise motion is linked and joined together with a second device as shown in FIG. 7 rotating in a counter-clockwise rotation, vertically aligned, with their pulling pulsations directed together in one direction perpendicular to the centre line of their main axles laterally aligned. The opposite rotating devices are controlled by a device schematically indicated at 40 to rotate synchronously in opposite directions and are turned to emit their pulsations timed exactly together. All lateral movement that occurred with a single device has now been neutralized or negated due to opposite and equal action and reaction and is balanced through the interaction of one device upon the other. The perpendiclar motion of the tandem devices has not been neutralized and when magnets are not activated, each device moves forward and backward between its centre of balance. An inching forward effect may be experienced in operation during that period where magnets are not activated in 0 gravity. These tandem devices with magnet actuation combined with the lateral stabilization through interaction balancing maintain balance as each planet is held in, maintaining the short radii between the planet and device axle uniformly during the planet loading cycle portion of orbit. The pulling forces at the release points of the two devices are greater than that momentum force of the opposite planets at their minimum radii to the device's axle, thereby creating movement in one direction of the devices. Therefore, any objects attached to the tandem devices is carried in that direction of the pulling force release point.

The acceleration of the craft in a 0 gravity or normal gravity field remains constant if rotation is maintained and hence the velocity continuously increases.

Under 0 gravity conditions, decrease of velocity is achieved through reversing the direction of the pulling force release points of the device in the opposite direction.

Manoeuverability is attained in a similar manner through the control of the stabilizing gears of the devices together with the rate of rotation and the magnetic field strength of the electromagnets.

Acceleration of the device can be controlled by varying the rate of revolution of the device, and the magnetic strength of the electromagnets. Momentum acceleration is logarithmically continuous during the operation of the device.

A directional change over 360° plane is attained through adjusting the position of the stabilizing gear 30 which re-locates the release point of the pulling pulsations of the planets.

To cease movement, that is to effect a stopping action of the device and of any objects attached thereto, the stabilizing gear 30 of the device is reversed in direction. The pulling pulsations then act at 180° relative to the initial direction to bring the device to a stop.

Figure 6:
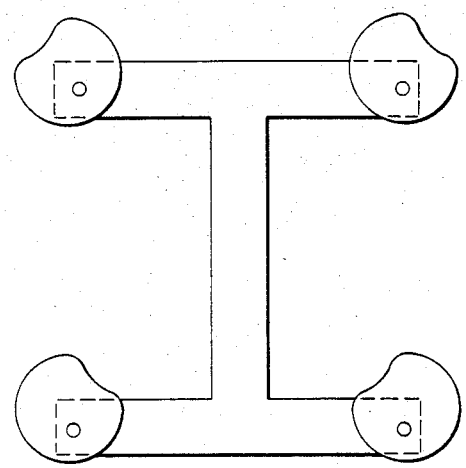
FIG. 6 is a schematic illustration of the path of movement the planet masses of an apparatus incorporating four such bodies.

It is to be noted that each device must be tuned to operate properly. With the planet in the 6 o'clock position (as shown in FIG. 6 with the shortest radius between the planet and the axle 32), the corresponding gear 27 turns in the same direction as the wheel. The crank portion carrying the free moving planet begins to take the planet back to the electromagnetic field. The magnetic force takes hold of the planet restricting the planet from maintaining its centrifugally created position. The planet pickup begins at the 5 o'clock position.

This action restricts the radius between the centre of the planet to the main wheel axle to assure the length compared to its natural centrifugally held position. This holding action is maintained until that line from the centre of the main wheel axle and the centre of the crank gear axle reaches the approximate position of 1 o'clock. Depending upon the r.p.m. of the device and the momentum affecting the size of the planet mass, the timed deactivation of the magnet will occur within an advance and retard control. When the planet is released at 1 o'clock, the timing must be such that mass reaches its extended centrifugal position upon reaching the 12 o'clock location.

The range of pulling force strength is determined by the size of the device and its maximum usable rate of revolution. Each pair of devices delivering a greater pulling force than their weight on earth determine the number of such devices to be used to accomplish the work required.

Figure 8:
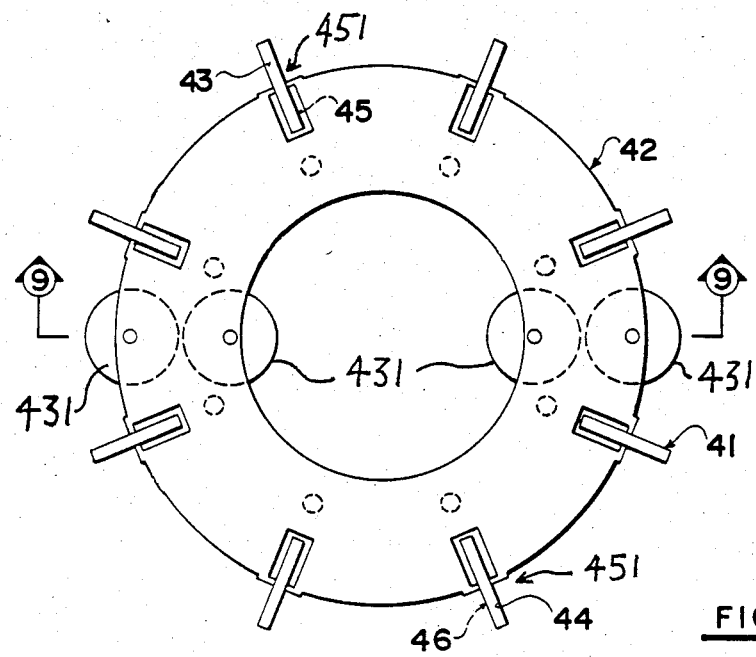
FIG. 8 is a schematic plan view of an apparatus providing a complete propulsion system for a vehicle.
Figure 9:
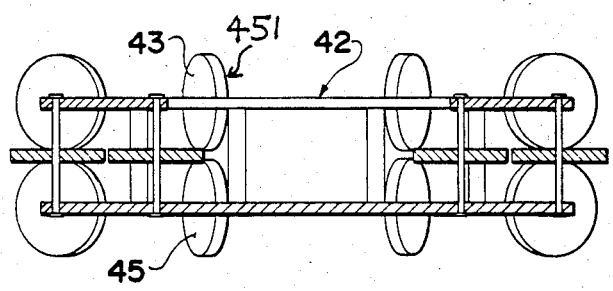
FIG. 9 is a schematic side elevational view of the propulsion system of FIG. 8.

The most adaptable and suitable method of installation to power a vehicle craft utilizing this pulling force only for craft mobility will be circular and internally mounted for servicing access. The pairs of devices will be matched opposite each other at the ends of diameter at the periphery of the circle of devices. This is illustrated in FIGS. 8 and 9 where the pairs are illustrated schematically at 41 and the circular frame at 42 the mate or pair to each device can be interchanged depending upon the need for craft manoeuverability. Thus for example a mating of the wheels 43 and 44 in a pair will cause an upward force while changing the mated pair to 43 and 45 will cause a sideways movement. Thus the pairs formed by wheels 41, 43, 45 and 46 form a rectangular cell of wheels indicated generally at 451. Two pairs of wheels 431 are arranged in a plane at right angles to that of the wheels 41, 43, 45, 46 to provide maneuverability around the axis of the frame 42. The functions of the devices would be computer controlled, particularly with regard to the rate of revolution, magnetic field strength, advance and retard of magnetic release and central stabilizing gear direction.

The motion of the planets of the pair of devices is schematically illustrated in FIG. 6.

The planet is taken into its orbit through its attraction to the electromagnets causing a warping effect on the planet visual orbit path as shown. As explained previously, the pendulum mounted planet is turned 90° away from its natural centrifugally created position through the effect of the electromagnets on its motion. The planet's momentum and velocity are at their greatest during this orbit phase and the momentum is magnified as the planet is released by the electromagent allowed through centrifigal force to return to the original centrifugally created orbital path at the top of the cycle or the release point. The velocity of the planet now beings deceleration action until it reaches that point opposite and furthest away from the release point which is referred to as the 0 point or shortest radius between the planet and the main wheel frame axle.

Therefore, as the main wheel retains a set continuous rotation, it is observed that the momentum of the planet is a variable, increasing and decreasing pulsations within the wheel.

Visualizing the main wheel and describing the planet's position, with the magnets not activiated, it is noted that their relative momentum is equal at the 3 and 9 o'clock positions. It is further noted that at the 0 point or 6 o'clock position, the momentum of the planet mass is less than that relative to the mass momentum at 3 and 9 o'clock positions. The planet velocity at the release point or 12 o'clock position is at its greatest.

When the electromagnets are activated, there is produced a visual warping of this orbit path as shown in FIG. 6. This effect is produced by a magnet holding the planets steadfast after leaving the 0 point where it begins the acceleraton portion of the cycle. Therefore, the planet's momentum remains constant and does not increase during this holding portion of the orbit's cycle. The planet is out of its centrifugal balance position. Prior to the planet reaching the release point area, allowing the planet to return to its centrifugal position. During the planet's return, it is observed that the velocity of the planet has been further increased through centrifugal force as the planet pendulums itself to its original orbit path. The inertia of the kinetic energy of the planet mass is dispersed at the end of its momentum acceleration completion at the release point position resuming its orbit position and again begins its next orbit velocity changing cycle.

The planet therefore produces a pulling effect upon the disc to which it is attached and this pull is transferred to the main wheel frame to which it is seccured.

Figure 10:
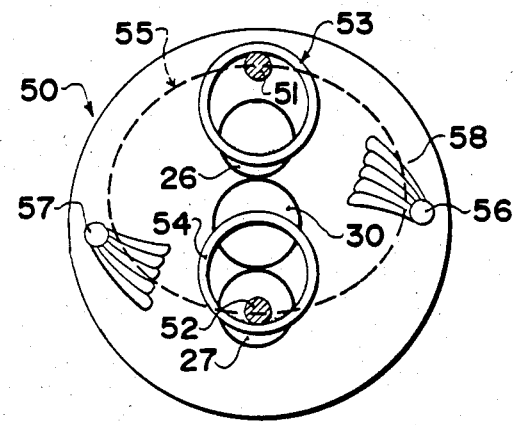
FIG. 10 is a cross-sectional view similar to FIG. 1 of a modified arrangement of one body or EZKL.

Referring now to FIG. 10 there is shown a modified arrangement incorporating a wheel generally indicated at 50 of the type illustrated in FIGS. 1, 2 and 3 incorporating the stationary gear 30 and the rotating gears 26 and 27 which provide the axes which rotate around the shaft 32 (not shown in this figure). In place of the planet masses 33 and 34 which are formed as simple pendulums eccentrically mounted on the gears, the planet masses of this arrangement are provided by weights 51 and 52 which are constrained to move within a pair of rings 53 and 54. The rings are carried on the rotating gears 26 and 27 eccentrically relative thereto so that again the masses 51 and 52 are constrained to move relative to the wheel 50 in a path illustrated in dotted line at 55. In view of the eccentricity of the mounting of the rings on the gears, the path lies closer to the axis of the fixed gear 30 at the 6 o'clock position as illustrated at 52 than it does at the 12 o'clock position as illustrated at 51. Thus the planet is moving at a maximum velocity at the largest distance at the 12 o'clock position. The use of rings in place of the rigid eccentric mounting of the pendulums of the earlier embodiment enables a greater degree of freedom of the movement of the masses 51 and 52 so that a greater kink or distortion of the path can be obtained by the electromagnetic restraining devices schematically indicated at 56 and 57.

The position of the rings on the gears can be adjusted so as to vary the eccentricity whereby the movement of the masses can be tuned for greatest efficiency.

In addition in this embodiment the electromagnetic devices 56, 57 have a plurality of separate fingers or portions 58 which can be separately actuated in order to control the timing and positioning of the electromagnetic effect. It will be appreciated that as the angular velocity of the wheel 50 changes under control of the device 40 illustrated in FIG. 7, the path of the planet masses 51 and 52 will vary and therefore in order to properly tune the device the position and timing of the electromagnetic effect must also be variable.

The device shown in FIG. 8 is in a suitable propulsion system for a vehicle. A simplified propulsion system can be obtained using two rectangular cells of the type indicated at 451 each of four wheels and arranged at right angles. This can be mounted in a propulsion pack including a suitable power source in the form of electric motor for driving the wheels.

In a further alternative arrangement (not shown) one or more of the rectangular cells formed by four such wheels could be mounted on a belt or harness which could be particularly effective in supporting a parapelegic or other person who would otherwise immobile.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for developing a propulsion force comprising two symmetrical bodies, support means mounting the bodies for rotation about parallel spaced first axes and driving means for synchronously rotating the symmetrical bodies about the respective axes in opposite directions, each body including a pair of planet masses, means mounting each planet mass on the respective body, said mounting means being arranged such that the respective mass can freely rotate eccentrically about a second axis parallel to the first and such that the second axis rotates with the body about the first and moves radially relative to the first in timed relation to the rotation of the body so as to move during each cycle of rotation of the body from a position of minimum spacing to a position of maximum spacing and back to the position of minimum spacing from the first, and means for cyclically inhibiting and releasing rotation of the planet mass about the respective second axis so as to cause the planet mass to pivot inwardly relative to the first axis whereby said releasing causing a force outwardly of the first axis with the bodies arranged such that a resultant force from said forces lies at right angles to a plane adjoining the axes.

2. The invention according to claim 1 wherein the bodies are in the form of wheels lying in the same plane ar right angles to the axes.

3. The invention according to claim 1 wherein the mounting means includes a pair of gearwheels mounted on the respective body for rotation about respective gear axes parallel to and spaced from the first axis, on each of which gearwheels a respective one of the second axes is eccentrically defined and means for rotating the gearwheels about the respective gear axes in synchronizism with the rotation of the body about the first axis.

4. The invention according to claim 3 wherein each planet mass comprises pendulum eccentrically attached to a respective one of the gearwheels.

5. The invention according to claim 3 wherein each planet mass comprises a free mass constrained to move within a ring.

6. The invention according to claim 5 wherein the ring is circular and attached eccentrically to a respective one of the gearwheels.

7. The invention according to claim 1 wherein the inhibiting means is arranged at a position just prior to the position of maximum spacing whereby when released the planet mass moves to its maximum spacing from the first axis to provide a whip-like action.

8. The invention according to claim 1 wherein the inhibiting means comprises electromagnetic means and means for timing actuation thereof in synchronism with rotation of said body.

9. The invention according to claim 1 wherein the inhibiting means comprises magnetic means.

10. The invention according to claim 1 wherein the planet masses are mounted on the body at 180° spacing thereof.

11. The invention according to claim 1 wherein the inhibiting means is mounted on the body for rotation therewith.

12. The invention according to claim 1 including two further bodies symmetrical to the first bodies with the axes of the four bodies arranged in parallel spaced relation at the apex of a rectangular defining a rectangular cell and means for changing the direction or rotation of the bodies and for synchronizing the rotation in different pairs whereby a resultant force can lie in any of four different directions.

13. The invention according to claim 12 including at least one further rectangular cell with the axes thereof at an angle to those of the first rectangular cell.

14. The invention according to claim 13 including a plurality of rectangular cells with respective pairs of each cell arranged at the ends of diameters of a circular support frame and two further pairs of bodies arranged on the frame with their axes parallel to and spaced from a central axis of the circular support frame.

* * * * *